US012585368B2

(12) United States Patent
Amano

(10) Patent No.: US 12,585,368 B2
(45) Date of Patent: Mar. 24, 2026

(54) INPUT DISPLAY DEVICE

(71) Applicant: ALPS ALPINE CO., LTD., Tokyo (JP)

(72) Inventor: Takashi Amano, Fukushima (JP)

(73) Assignee: ALPS ALPINE CO., LTD., Tokyo (JP)

( * ) Notice: Subject to any disclaimer, the term of this patent is extended or adjusted under 35 U.S.C. 154(b) by 0 days.

(21) Appl. No.: 18/904,449

(22) Filed: Oct. 2, 2024

(65) Prior Publication Data

US 2025/0123722 A1     Apr. 17, 2025

(30) Foreign Application Priority Data

Oct. 17, 2023     (JP) ................................. 2023-179026

(51) Int. Cl.
 *G06F 3/041* (2006.01)
 *G06F 3/044* (2006.01)
(52) U.S. Cl.
 CPC .......... *G06F 3/0447* (2019.05); *G06F 3/0412* (2013.01)
(58) Field of Classification Search
 None
 See application file for complete search history.

(56) References Cited

U.S. PATENT DOCUMENTS

| | | | |
|---|---|---|---|
| 2011/0157056 A1* | 6/2011 | Karpfinger | G06F 3/041 |
| | | | 345/173 |
| 2017/0168593 A1 | 6/2017 | Kwak | |
| 2020/0233521 A1 | 7/2020 | Sasaki et al. | |

FOREIGN PATENT DOCUMENTS

| | | |
|---|---|---|
| DE | 102014218847 | 3/2016 |
| DE | 112017007920 | 7/2020 |
| EP | 2511807 | 10/2012 |
| JP | 2020-190832 | 11/2020 |

OTHER PUBLICATIONS

Extended European Search Report for 24205338.7 mailed on Feb. 11, 2025.

* cited by examiner

*Primary Examiner* — Brian M Butcher
(74) *Attorney, Agent, or Firm* — IPUSA, PLLC

(57) ABSTRACT
An input display device includes a display that displays an image, a capacitive touch sensor disposed on the display, a three-dimensional operation part disposed on the capacitive touch sensor and capacitively coupled to the capacitive touch sensor, a detector that detects a touch position of an operating finger on the three-dimensional operation part, and a determination part that determines whether or not tilting operation is performed on the three-dimensional operation part based on a movement amount of the touch position in a set direction detected by the detector.

5 Claims, 7 Drawing Sheets

FIG.3A RELATED ART
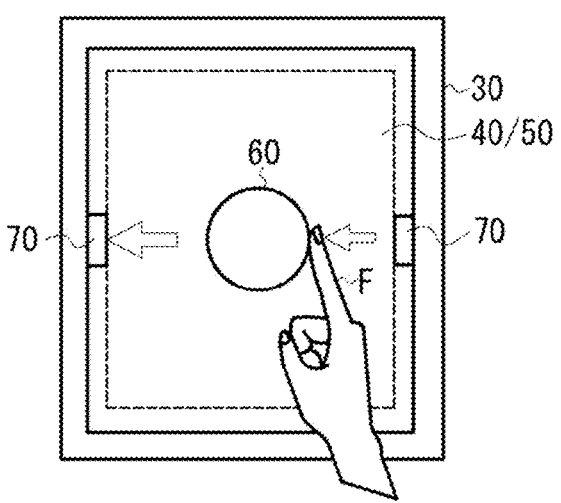
FIG.3B
RELATED ART
FIG.3C
RELATED ART
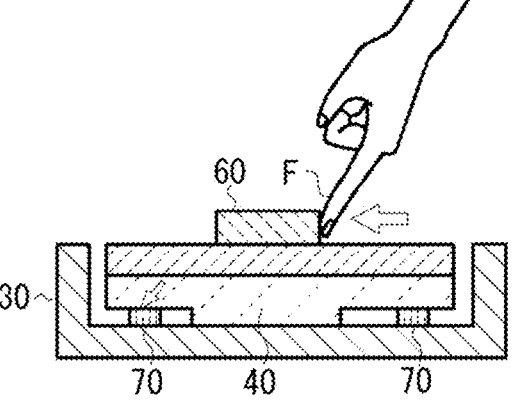

POSITION OF ROTARY KNOB

INPUT DISPLAY DEVICE

CROSS-REFERENCE TO RELATED APPLICATIONS

This patent application is based on and claims priority to Japanese Patent Application No. 2023-179026 filed on Oct. 17, 2023, the entire contents of which are incorporated herein by reference.

TECHNICAL FIELD

The present disclosure relates to an input display device having an interface function between a person and a machine, and particularly to an input display device including a three-dimensional operation part.

BACKGROUND

An input display device is disclosed (for example, Japanese Unexamined Patent Application Publication No. 2020-190832), and the disclosed input display device includes projected portions on a touch panel that is disposed to overlap a display, and displays images, such as operation icons and the like, in the positions overlapping the projected portions. A user performs input through touch operation performed on the projected portions.

In a display device operated by capacitive touch operation, a user interface (referred to as a three-dimensional UI, hereinafter) includes a cover glass whose surface is provided with a projected portion with a depression to allow tactile recognition of a touch position so that the touch position can be recognized without gazing.

FIG. 1A illustrates an operation example of a flat touch panel of the related art, where a user U views an operation icon 12 displayed on a display 10, and performs input by operation of touching the area of the operation icon 12 (a musical note in the illustrated example).

FIG. 1B illustrates an operation example of a touch panel with a three-dimensional operation part (three-dimensional part) using a three-dimensional UI, and FIG. 1C is a schematic cross-sectional view of the three-dimensional operation part. A transparent cover lens 26 including a three-dimensional operation part, which is in a shape of a projection with a depression, is provided on a touch sensor (touch panel) 24 including capacitive sensors, and a display 20 displays an operation icon 22 at a position overlapping the cover lens 26. A user U performs input by touching a top of the cover lens 26 with a finger. For touch detection, a highly sensitive capacitive sensor capable of detecting capacitance (distance) of a finger, even if the finger is away from the sensor, is used so that whether or not there is a touch can be determined even over the cover lens 26 that is thick. Thus, it is possible to reduce touch mistakes (operation mistakes) in a circumstance where it is difficult to focus on an in-vehicle display during driving.

In the three-dimensional UI, it is possible for one protruding button with a depression to be operated by various operation methods through analysis of a touch gesture. For example, a rotary knob 60 illustrated in FIG. 2A can be operated, not only by operation of grasping with fingers F and rotating, but also operation of touching or pushing a top surface with a finger R in the arrow direction as illustrated in FIG. 2B, operation of flicking or swiping a top surface with a finger F in the arrow direction as illustrated in FIG. 2C, and operation of pushing against a side surface of the knob with a finger F in a horizontal direction as illustrated in FIG. 2D (the operation of pushing against the side surface of the three-dimensional operation part is referred to as tilting operation). Thus, a variety of gesture operations can be detected, and responses corresponding to the gestures can be performed.

Such multi-functionalization of a protruding button with a depression contributes improvement of operability and reduction in the number of three-dimensional components disposed on a touch panel. The wider range of gestures a button can detect, the more versatile it becomes.

The above rotary knob detects a gesture with reference to a movement at a touch detection point or a change in a detection volume. Among various gestures, tilting operation illustrated in FIG. 2D is operation of applying force in up-down and left-right directions, while an operating finger F is put (fixed) on the side surface of the knob. As a simple detection method of the tilting operation, for example, there is a method using pressure-sensitive sensors as illustrated in FIGS. 3A to 3C.

FIG. 3A is a schematic top view of an input display device, and FIGS. 3B and 3C are schematic cross-sectional views of FIG. 3A. A video display 40 and a cover glass 50 are housed in a rectangular case 30, where the video display 40 includes a display, a touch sensor, and the like, and the cover glass 50 is attached on the video display 40. A rotary knob 60 is attached onto the cover glass 50, for example, with an adhesive. FIG. 3B illustrates a configuration example where pressure-sensitive sensors 70 are disposed at side surfaces of the video display 40, and FIG. 3C illustrates a configuration example where pressure-sensitive sensors 70 are disposed at the bottom of the video display 40. The pressure-sensitive sensors 70 detect, for example, a change in resistance against pressure, or a distance to an object using a photo reflector including a light emitting element and a light receiving element.

During tilting operation, as the side surface of the knob 60 is pushed in a horizontal direction by an operating finger F, the pressure or the distance to the finger F is detected by the pressure-sensitive sensors 70. However, addition of pressure-sensitive sensors 70 to detect tilting operation brings negative factors, such as increase in cost of parts, necessity of optimization of an installation structure, and the like. Thus, there is a need for providing a detection method that does not rely on additional parts, such as pressure-sensitive sensors, and the like.

SUMMARY

According to one aspect of the present disclosure, an input display device includes a display that displays an image, a capacitive touch sensor disposed on the display, a three-dimensional operation part disposed on the capacitive touch sensor and capacitively coupled to the capacitive touch sensor, a detector that detects a touch position of an operating finger on the three-dimensional operation part, and a determination part that determines whether or not tilting operation is performed on the three-dimensional operation part based on a movement amount of the touch position in a set direction detected by the detector.

BRIEF DESCRIPTION OF THE DRAWINGS

Other objects and further features of the present disclosure will be apparent from the following detailed description when read in conjunction with the accompanying drawings, in which:

FIGS. 3A to 3C are views illustrating a configuration of an input display device of the related art, in which pressure-sensitive sensors for detecting tilting operation of a rotary knob is disposed;

DETAILED DESCRIPTION OF EMBODIMENTS

The present disclosure aims to solve the above-described problems existing in the related art, and to provide an input display device capable of detecting tilting operation performed on an three-dimensional operation part without using a pressure-sensitive sensor.

The input display device of the present disclosure provides an interface between a person and a machine. For example, the input display device of the present disclosure is applied to, but not particularly limited to, an electronic device in which a display with a touch panel is mounted, and the like. The electronic device, in which the display with the touch panel is mounted, is, for example, an in-vehicle device having a navigation function, an audio and visual function, a television function, and the like.

According to one aspect, the set direction is determined according to the touch position of the operating finger on the three-dimensional operation part. According to another aspect, the determination part determines that the tilting operation is performed when the movement amount in the set direction is equal to or greater than a threshold value. According to yet another aspect, the three-dimensional operation part is disposed on the capacitive touch sensor via an elastic member that is elastically deformable in a horizontal direction. According to yet another aspect, the three-dimensional operation part is disposed on a cover glass, and the cover glass is disposed on the capacitive touch sensor via an elastic member that is elastically deformable in a horizontal direction. According to yet another aspect, the detector detects the touch position of the operating finger on a side surface of the three-dimensional operation part, and the determination part determines whether or not tilting operation is performed based on the movement amount of the touch position caused by compression of the operating finger when the operating finger pushes against the side surface of the three-dimensional operation part.

According to the present disclosure, it is configured to determine whether or not tilting operation is performed on the three-dimensional operating part based on a movement amount of a touch position of an operating finger, and therefore tilting operation can be detected at low cost and with a simple configuration without using a pressure-sensitive sensor. Thus, more advanced multi-functionalization of operation of the three-dimensional operation part can be made possible.

Figure 1A:
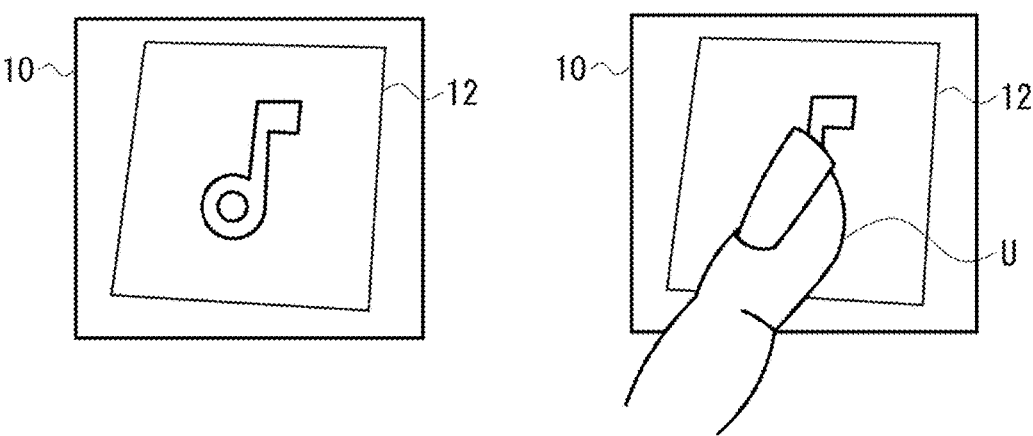
FIG. 1A is a view illustrating an operation example of a flat touch panel of the related art.
Figure 1B:
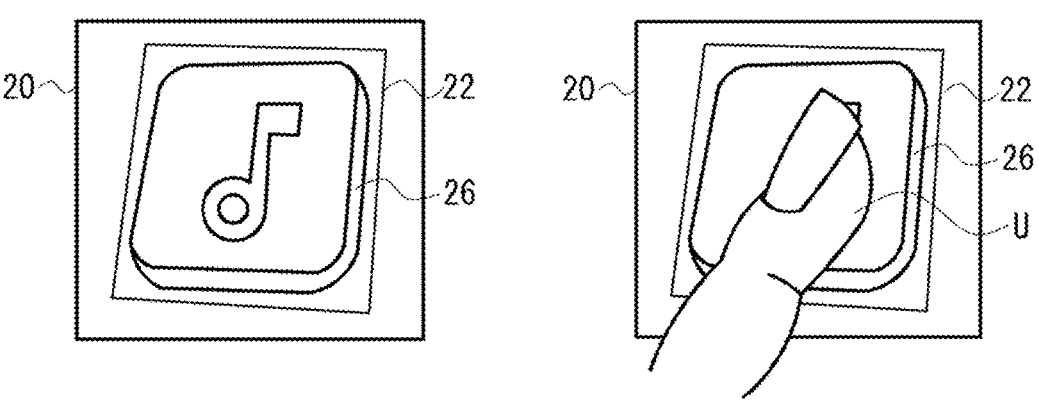
FIG. 1B is a view illustrating an operation example of a tough panel of a three-dimensional operation part of the related art.
Figure 1C:
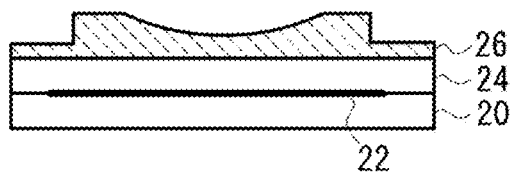
FIG. 1C is a cross-sectional view illustrating the three-dimensional operation part.
Figure 2A:
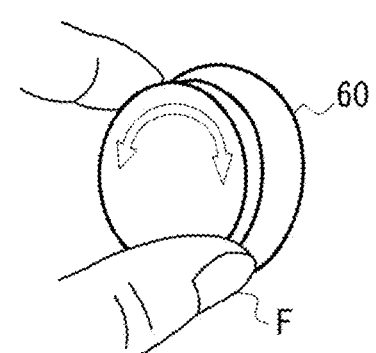
FIGS. 2A to 2D are views illustrating various gesture examples assigned to a rotary knob of the related art.
Figure 2B:
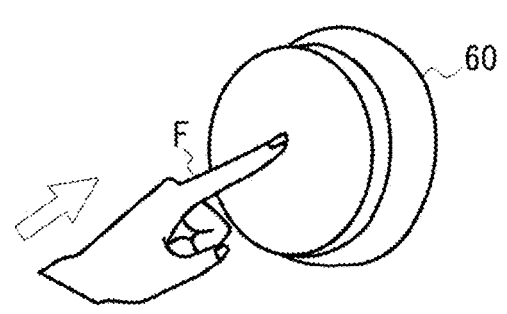
Figure 2C:
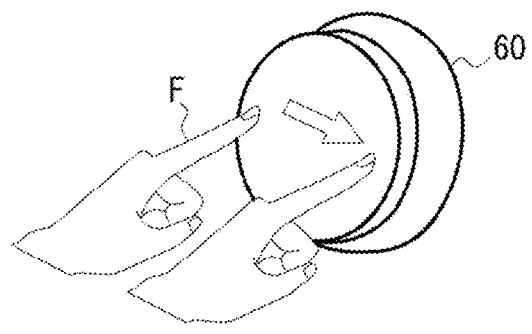
Figure 2D:
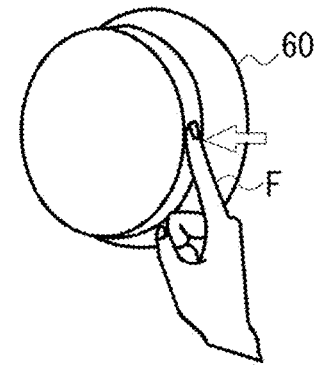
Figure 4A:
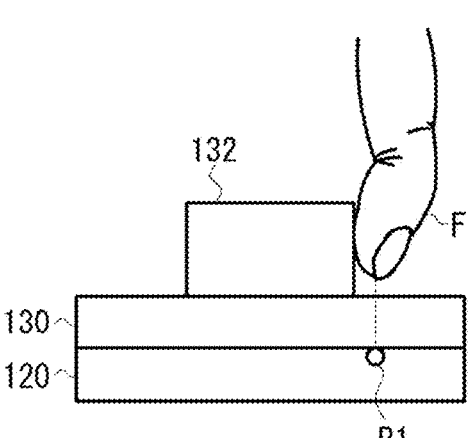
FIGS. 4A and 4B are views schematically illustrating an example of the input display device of the present disclosure.
Figure 4B:
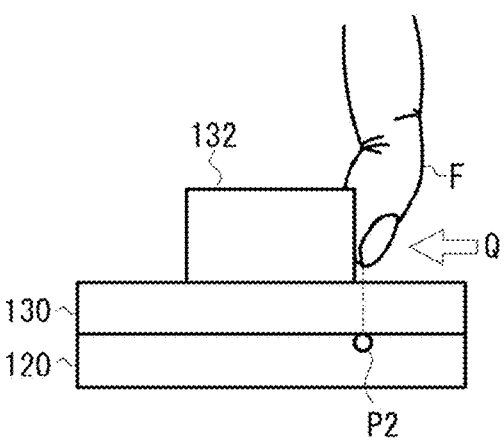

An embodiment of the present disclosure will be described next. In the present embodiment, tilting operation is detected using compression of a finger caused by pressing the finger against a three-dimensional operation part when tilting operation is performed on the three-dimensional operation part (three-dimensional part). The principle thereof is depicted in FIGS. 4A and 4B. A cover glass 130 is disposed on a capacitive touch sensor 120, and a rotary knob 132 is disposed on the cover glass 130. The capacitive touch sensor 120 is arranged immediately below the cover glass 130, and detects a touch position on the cover glass 130 or a touch position on the knob 132 based on a change in capacitance.

FIG. 4A illustrates a state (touched state) in which a side surface of the knob 132 is touched by a finger F. At this point, the capacitive touch sensor 120 detects coordinates (detection point) P1 of the finger F touching the side surface of the knob 132. When tilting operation is performed on the knob 132, a user pushes his or her finger F into the side surface of the knob 132 in the direction Q as illustrated in FIG. 4B, thereby causing the finger F to become compressed. The capacitive touch sensor 120 detects coordinates (detection point) P2 of the compressed finger F. By observing a movement amount ($|P1-P2|$) of the detection point (coordinates) caused by compression of the finger during the tilting operation, the tilting operation can be detected only using the capacitive touch sensor 120.

Note that, the three-dimensional operation part is not limited to a rotary knob, and may be in any other shapes provided that the tilting operation can be performed on the three-dimensional operation part. Moreover, the three-dimensional operation part (knob 132) and the cover glass 130 may constitute one component, or the three-dimensional operation part may be fixed on the cover glass 130 with an adhesive or the like.

EXAMPLES

Figure 5A:
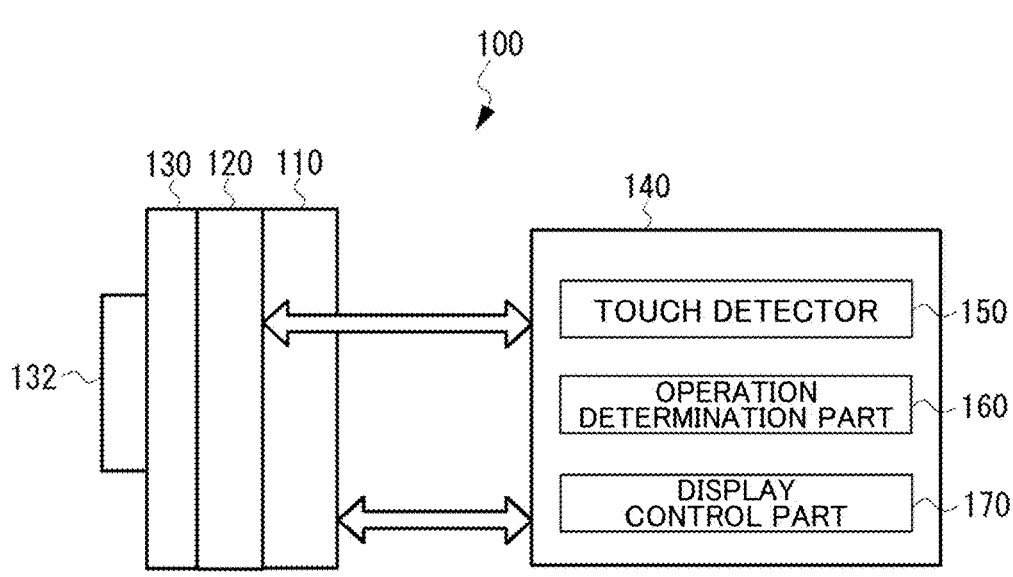
FIG. 5A to 5C are block diagrams illustrating a configuration of the input display device according to an example of the present disclosure.
Figure 5B:
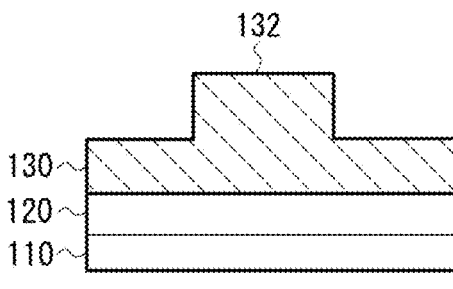
Figure 5C:
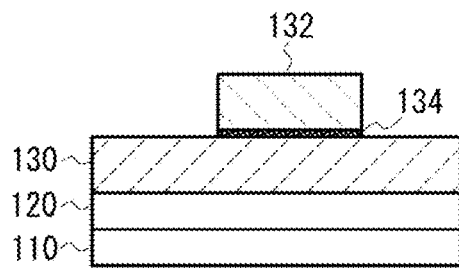

Next, examples of the present disclosure will be described in detail with reference to drawings. FIGS. 5A to 5C are block diagrams illustrating a configuration of the input display device according to an example of the present disclosure. The input display device 100 of the present example includes a display 110 that displays an image or a video, a touch sensor 120 including a capacitive sensor mounted on the display 110, a cover glass 130 disposed on the touch sensor 120, a three-dimensional operation part (three-dimensional part) 132 serving as a three-dimensional UI disposed on the cover glass 130, and a controller 140 that performs control of image display of the display 110, control of touch detection or operation determination of the touch sensor 120, and the like.

The display 110 is not particularly limited, but includes, for example, a liquid crystal panel or an organic EL panel, and displays image data provided from the controller 140. For example, the display 110 may be configured to display an operation icon representing a content of input operation at a position corresponding to the three-dimensional operation part 132.

The touch sensor 120 includes a plurality of sensors (detector) provided at positions at which x-axis electrode lines and y-axis electrode lines intersect with one another, and each sensor detects capacitance when a finger or hand of a user comes close to or is in contact with the cover glass 130 or the three-dimensional operation part 132. The touch sensor 120 provides an input interface for a user to perform input to an icon or the like displayed on the display 110.

The cover glass 130 disposed on a surface of the touch sensor 120 may constitute part of the touch sensor 120, or may be a separate component from the touch sensor 120.

The three-dimensional operation part 132 serving as the three-dimensional UI is disposed on the cover glass 130. The three-dimensional operation part 132 is formed of a material that is capacitively coupled to the touch sensor 120, and operation performed on the three-dimensional operation part 132 is detected by the touch sensor 120.

The three-dimensional operation part 132 includes a portion projected from the surface of the cover glass 130. The projected portion allows a user to perform gesture operation at a position that is away from the cover glass 130. A shape, size, thickness, and the like of the three-dimensional operation part 132 are not particularly limited, as long as tilting operation can be performed thereon. The three-dimensional operation part 132 is, for example, a rotary knob, a rectangular slider with a projection, a protruding button with a depression, a projected key, or the like. Tilting operation is performed by pressing a side surface of any of these three-dimensional parts by a finger. Moreover, the three-dimensional operation part 132 is not necessarily transparent, and a letter, a symbol, a figure, or the like representing a content of input operation may be provided thereon.

The three-dimensional operation part 132 and the cover glass 130 may constitute one component as illustrated in FIG. 5B, or may be separate components as illustrated in FIG. 5C. For example, a bottom surface of the three-dimensional operation part 132 may be bonded to the cover glass 130 with a double-sided adhesive 134. In this case, the three-dimensional operation part 132 can be formed of a material different from a material of the cover glass 130. For example, the three-dimensional operation part 132 may be formed of acrylics, polycarbonate, or the like.

A position (coordinates) of the three-dimensional operation part 132 disposed on the touch sensor 120 is registered in memory of the controller 140, and the controller 140 determines whether or not operation is performed on the three-dimensional operation part 132 when the controller 140 detects a position of a finger coming close to or in contact with the touch sensor 120. Moreover, the controller 140 can register information about an outer shape, size, height, and the like of the three-dimensional operation part 132. The controller 140 can also cause the display 110 to display an icon representing a content of input operation in the vicinity of the three-dimensional operation part 132. A user can visually recognize the icon depicted on the three-dimensional operation part 132 or the icon displayed on the display 110, and perform input operation through the three-dimensional operation part 132.

The controller 140 includes hardware, software resources, or both, and is responsible for overall processing of the input display device using, for example, a microcontroller including an arithmetic processing unit and ROM/RAM. For example, the controller 140 performs display processing of the display 110, touch detection or operation determination (detection of a touch position, determination of tilting operation, and the like) based on an output value of the touch sensor 120, processing of video display or switching of display according to the determination result, and the like.

In one embodiment, the controller 140 includes a touch detector 150, an operation determination part 160, and a display control part 170, as illustrated in FIG. 5A. The touch detector 150 drives x-axis electrode lines, y-axis electrode lines, or both of the touch sensor 120 to measure capacitance at each of the detectors (sensors) of the driven electrode lines, and detects a touch position or the like based on the measurement result.

The operation determination part 160 determines touch operation performed on the display 110 or operation on the three-dimensional operation part 132 based on the detection result of the touch detector 150. For example, the operation determination part 160 determines touch operation performed on the display 110, touch operation or tilting operation performed on the three-dimensional operation part 132, and the like.

The display control part 170 displays an image or a video on the display 110, or optionally displays an icon at a position corresponding to the three-dimensional operation part 132. In the case where an icon is not depicted on an operation surface of the three-dimensional operation part 132, an icon representing a content of operation of the three-dimensional operation part 132 can be displayed on the display 110. Moreover, the display control part 170 switches an image to be displayed on the display 110 to another image according to the determination of the operation determined by the operation determination part 160.

Figure 6:
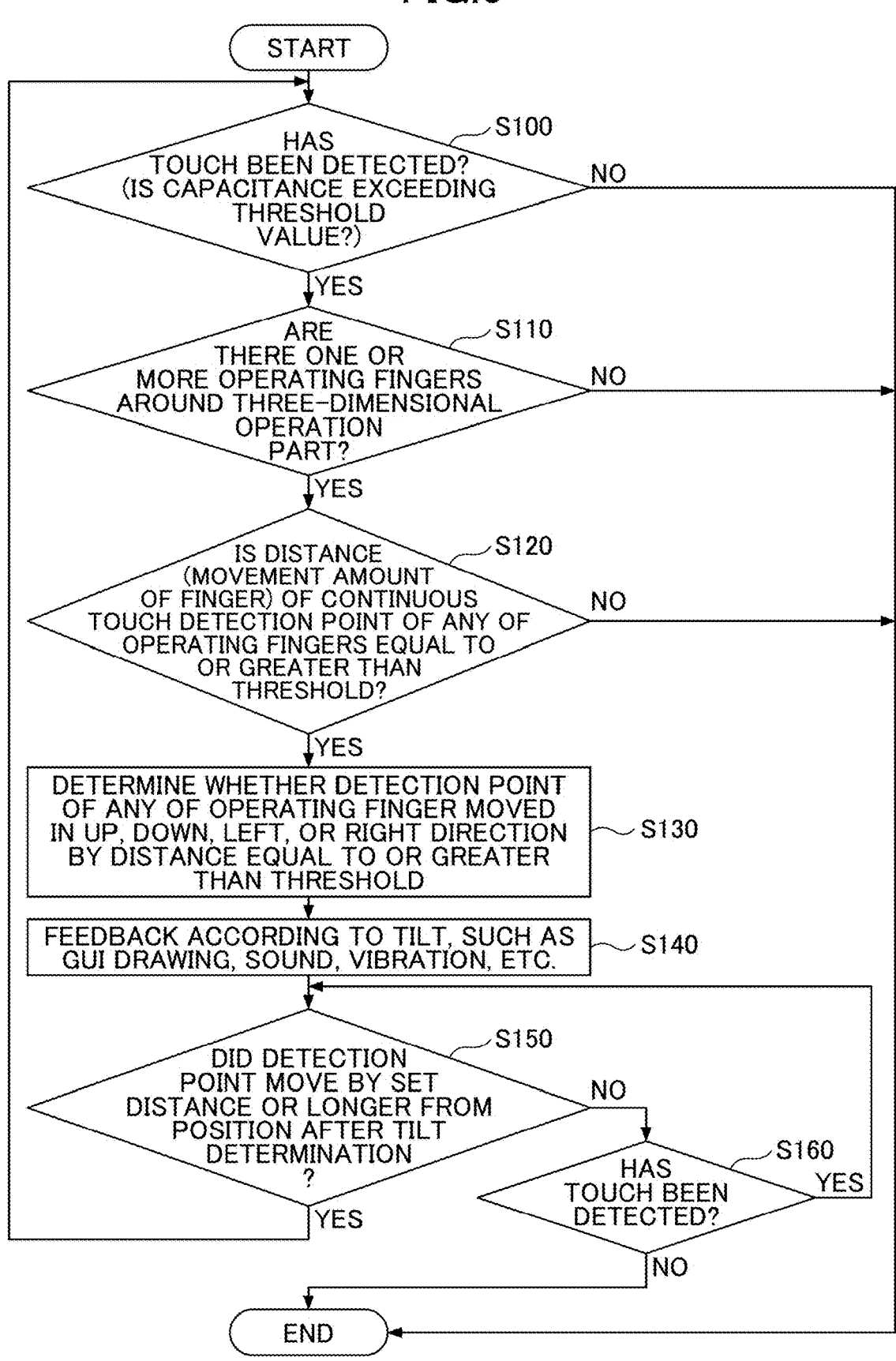
FIG. 6 is a flowchart illustrating an algorithm for detecting tilting operation of a three-dimensional operation part according to an example of the present disclosure.

Next, an algorithm for detecting tilting operation of the three-dimensional operation part of the input display device according to the present example will be described with reference to the flowchart of FIG. 6. First, the touch detector 150 determines whether or not a touch has been detected based on measured capacitance (S100). Specifically, it is determined that a touch is detected when capacitance is equal to or greater than a threshold value.

The detection result of the touch detector 150 is provided to the operation determination part 160. When the touch is detected, the operation determination part 160 determines whether or not there are one or more operating fingers in the vicinity of the three-dimensional operation part 132 (S110). Specifically, the operation determination part 160 compares, as illustrated in FIG. 4A, coordinates P1 of the finger F touching the side surface of the three-dimensional operation part 132 with an outline of the three-dimensional operation part 132 (the outline is known from the positional coordinates, an outer shape, and a size of the three-dimensional operation part 132), and determines that the finger F is in the vicinity of the three-dimensional operation part 132, if the coordinates P1 are in the vicinity of the outline. In the case where a multiple touch function for detecting a plurality of fingers is provided, the operation determination part 160 determines, for each finger, whether or not the finger is in the vicinity of the three-dimensional operation part.

In the case where it is determined that an operating finger is in the vicinity of the three-dimensional operation part 132, the operation determination part 160 determines whether a distance of the continuous touch detection point (coordinates P1) (movement amount of the finger) of any of the operating fingers is equal to or greater than a threshold value (S120). This allows determination of the state of the finger, whether or not the finger is put (fixed) on the three-dimensional operation part 132, thereby eliminating a case of rotational operation performed on the three-dimensional operation part or a case where a finger accidentally touches the three-dimensional operation part 132. In one embodiment, the operation determination part 160 determines whether or not a finger is fixed or not based on the detected coordinates recorded over a certain period of time, or based on the comparison between the average of distance between the above two points, depending on the performance of the sensor.

In the case where it is determined that the finger is put on the three-dimensional operation part 132, the operation determination part 160 determines whether or not the detection point of any of the operating fingers is moved by a distance equal to or greater than a threshold value in any direction of up, down, left, or right (S130). Specifically, the operation determination part 160 determines whether or not tilting operation is performed. In one embodiment, as the threshold value of the movement amount by which tilting operation is determined, for example, a movement amount caused, for example, when a load of approximately 4 N is applied is set as a threshold value with reference to a load of a push-type mechanical switch (approximately 3 N is applied when a knob is lightly gripped), so as not to react when the knob is simply gripped.

Moreover, it is necessary to set in advance the direction of the detection point coordinates to be detected depending on the position where the finger touches the three-dimensional operation part 132. This is to prevent rotational operation performed on the three-dimensional operation part 132 from being erroneously determined as tilting operation.

Figure 7:
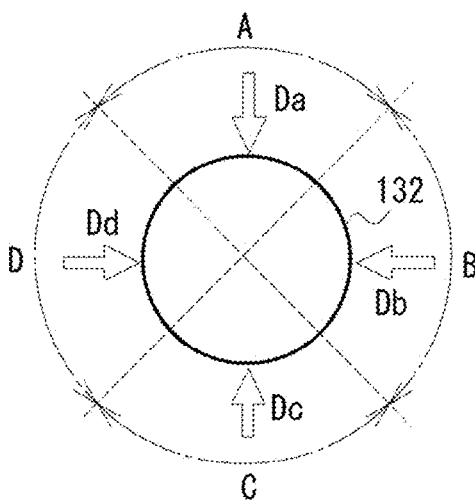
FIG. 7 is a view illustrating a relationship between a touch position on the three-dimensional operation part and a moving direction of a finger.

As illustrated in FIG. 7, for example, a touch position with a finger is divided into four areas A, B, C, and D at intervals of 90 degrees from the center of the knob 132, and the operation determination part 160 determines whether or not a movement distance of the finger in the direction of Da, Db, Dc, or Dd corresponding to the area A, B, C, or D, respectively, is equal to or greater than a threshold value. For example, when a finger is put on the area B and the movement distance of the finger in the direction Db is equal to or greater than a threshold value, it is determined as tilting operation. In the case where a finger is rotated in the clock-wise direction to perform rotational operation, even if the movement distance in the direction Da is equal to or greater than the threshold value, the direction of the movement is different from the direction Db of the touch position B, and therefore it is not determined as tilting operation performed downward.

As the tilting operation is determined by the operation determination part 160, the display control part 170 performs feedback according to the tilting operation (S140). For example, the display control part 170 causes the display 110 to depict GUI, or to output a sound or vibrations via a driver (not illustrated).

Next, the operation determination part 160 determines whether or not the detection point has moved from the position after the tilting determination by a set distance or greater (S150). This determines whether or not the tilting operation has ended. In the case where the detection point has been moved by the set distance or greater, the tilting operation has continued, and the process returns to step S100. In the case where the detection point has not moved by the set distance or greater, it is determined that the tilting operation has ended, and then the operation determination part 160 detects whether or not a touch is detected based on the detection result of the touch detector 150 (S160). If the detection of the touch is continued, the process returns to step S150. If the detection of the touch is not continued (if the finger is detached), the process is ended.

When a touch is not detected in step S100, when one or more fingers are not detected in step S110, and when the movement amount of the finger is less than the threshold value in step S120, the process is ended.

Figure 8:
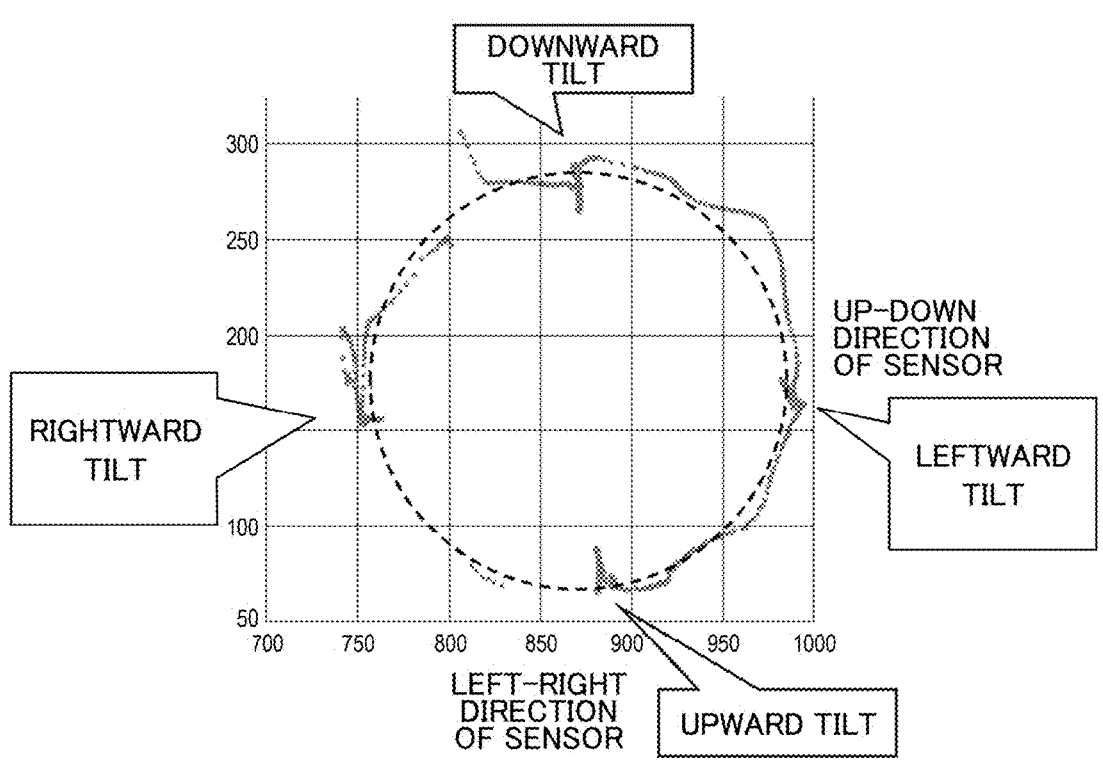
FIG. 8 is a view illustrating a movement example of a detected touch position when tilting operation is performed in four directions, up, down, left, and right directions of the rotary knob.

FIG. 8 depicts a change in the detection point when tilting operation is actually performed in four directions, i.e., upward, downward, leftward, and rightward directions, on a knob-type rotary part serving as the three-dimensional operation part. The dashed line represents an outer shape position of the knob, and the solid line represents the detection point (coordinates). As is clear from FIG. 8, it is found that the detection point during the tilting operation moves toward the inside of the rotary knob.

According to the present example, as described above, tilting operation performed on the three-dimensional operation part is determined based on the movement amount of the detection point (coordinates) caused by compression of a finger. Therefore, a pressure-sensitive sensor is not needed for determination of tilting operation, more advanced multi-functionalization of the three-dimensional operation part can be realized at low cost and with a simple configuration, and operability can be improved.

Next, another example of the present disclosure will be described. In the above-described example, whether or not tilting operation is performed is determined based on a movement amount of detection coordinates caused by compression of the finger, but it is sometimes a case that determination of tilting may not be accurately performed from the movement amount of the detection coordinates caused by the compression of the finger depending on performance of the touch sensor. Therefore, in this example, a structure for amplifying a movement amount of detection coordinates caused by compression of the finger is applied in order to detect tilting operation more accurately.

Figure 9A:
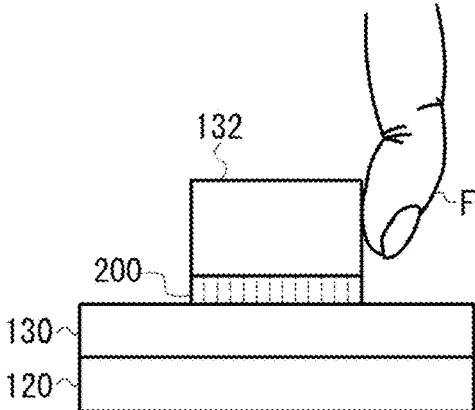
FIGS. 9A to 9D are views illustrating a three-dimensional operation part having a tilting function according to other examples of the present disclosure.
Figure 9B:
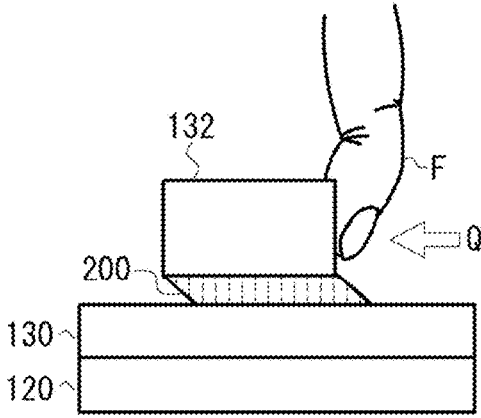

For example, as illustrated in FIGS. 9A and 9B, a structure where a cushioning material 200 that can be elastically deformable in a horizontal direction is inserted at a joint portion between the three-dimensional operation part (e.g., a rotary knob) 132 and the cover glass 130. A material of the cushioning material 200 is not particularly limited, as long as the material can be capacitively coupled to the touch sensor 120. The cushioning material 200 is fixed at the position between the three-dimensional operation part 132 and the cover glass 130, for example, with an adhesive or the like. By pressing the three-dimensional operation part 132 with a finger in the horizontal direction Q during tilting operation as illustrated in FIG. 9B, from the state where the finger F is put on the side surface of the three-dimensional operation part 132 as illustrated in FIG. 9A, in addition to that the finger F is compressed, the cushioning material 200 is elastically deformed in the horizontal direction Q, thereby amplifying the movement amount of the detection point (coordinates) detected by the touch sensor 120, and facilitating setting of a threshold value for determination of tilting operation.

Figure 9C:
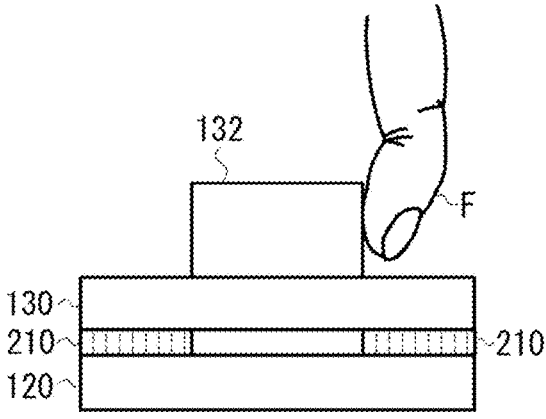
Figure 9D:
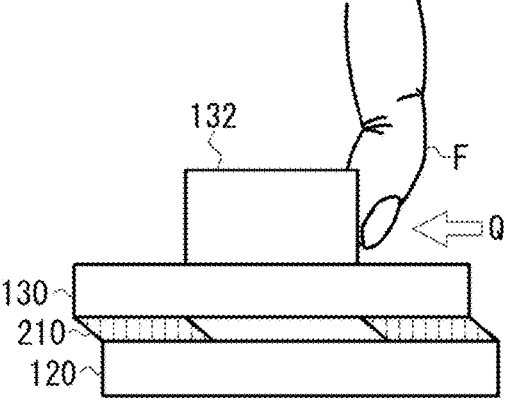

Moreover, it is also possible to use a structure where a cushioning material 210 that is elastically deformable is inserted at a joint portion between the cover glass 130 and the touch sensor 120, as illustrated in FIGS. 9C and 9D. In this case, by pressing in the horizontal direction Q with a finger F during tilting operation as illustrated in FIG. 9D from the state of FIG. 9C, in addition to that the finger F is compressed, the cushioning material 210 is elastically deformed in the horizontal direction Q, thereby amplifying the movement amount of the detection point (coordinates) detected by the touch sensor 120. The number, arrangement, and shape of the cushioning material 210 are appropriately selected according to a desired degree of amplification of the movement amount of the detection point.

Although the preferred embodiments of the present invention have been described in detail, the present invention is not limited to the specific embodiments, and various modifications and changes can be made within the scope of the gist of the invention described in the claims.

What is claimed is:

1. An input display device, comprising:
a display that displays an image;
a capacitive touch sensor disposed on the display;
a three-dimensional operation part disposed on the capacitive touch sensor and capacitively coupled to the capacitive touch sensor;
a detector that detects a touch position of an operating finger on the three-dimensional operation part; and
a determination part that determines whether or not tilting operation is performed on the three-dimensional operation part based on a movement amount of the touch position in a set direction detected by the detector,
wherein the movement amount is a distance between a first touch position (P1) that is detected by the capacitive touch sensor when the operating finger touches a side surface of the three-dimensional operation part, and a second touch position (P2) that is detected by the capacitive touch sensor when the operating finger is compressed by being pushed against the side surface of the three-dimensional operation part, and
the determination part determines that the tilting operation is performed when the distance between P1 and P2 is equal to or greater than a threshold.

2. The input display device according to claim 1, wherein the set direction is determined according to the touch position of the operating finger on the three-dimensional operation part.

3. The input display device according to claim 1, wherein the three-dimensional operation part is disposed on the capacitive touch sensor via an elastic member that is elastically deformable in a horizontal direction.

4. The input display device according to claim 1, wherein the three-dimensional operation part is disposed on a cover glass, and the cover glass is disposed on the capacitive touch sensor via an elastic member that is elastically deformable in a horizontal direction.

5. An input display device, comprising:
a display that displays an image;
a capacitive touch sensor disposed on the display;
a three-dimensional operation part disposed on the capacitive touch sensor and capacitively coupled to the capacitive touch sensor;
a detector that detects a touch position of an operating finger on the three-dimensional operation part; and
a determination part that determines whether or not tilting operation is performed on the three-dimensional operation part based on a movement amount of the touch position in a set direction detected by the detector,
wherein the three-dimensional operation part is disposed on a cover glass, and the cover glass is disposed on the capacitive touch sensor via an elastic member that is elastically deformable in a horizontal direction.

* * * * *